2 Sheets—Sheet 2.
F. H. C. MEY & M. J. STARK.
Drier and Cooler for Grain, &c.
No. 226,669. Patented April 20, 1880.
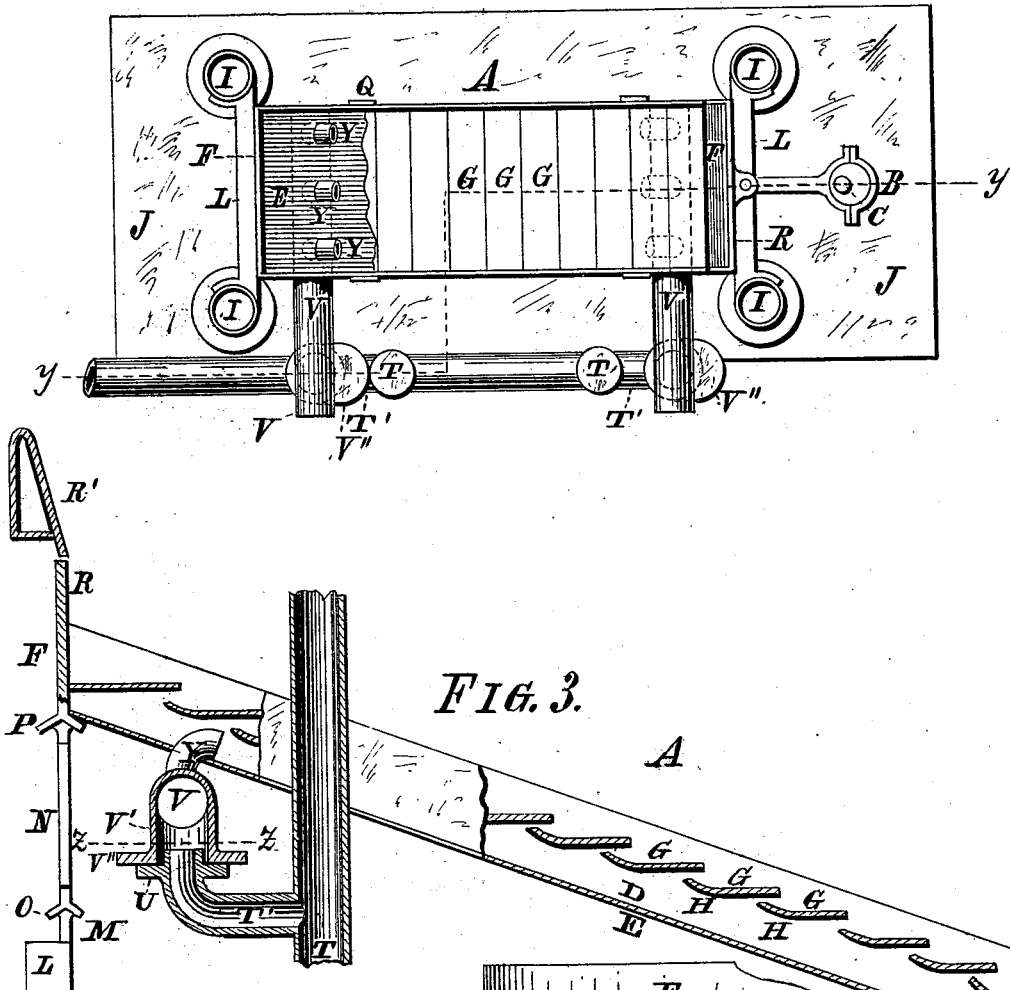
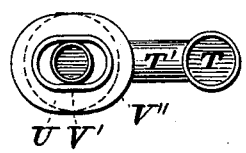
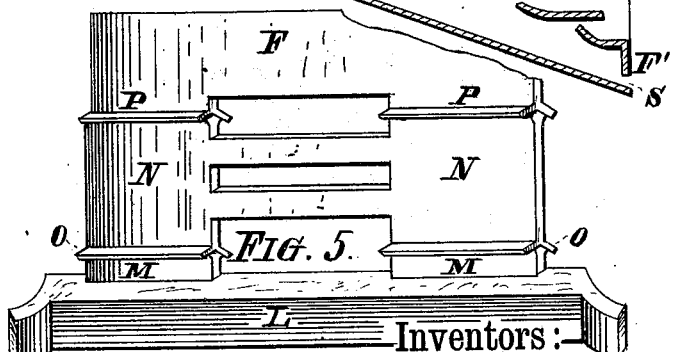

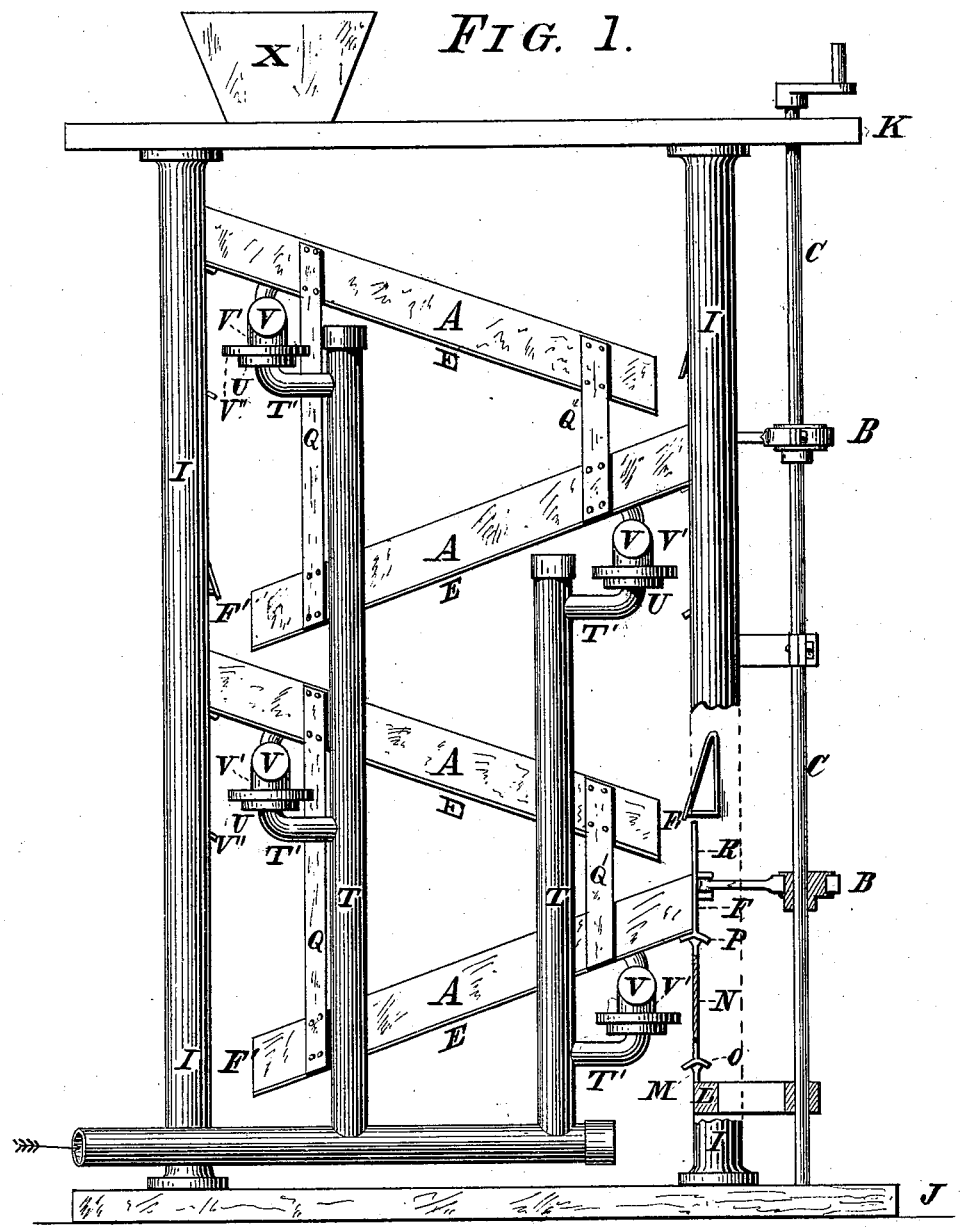

UNITED STATES PATENT OFFICE.

FREDERIC H. C. MEY AND MICHAEL J. STARK, OF BUFFALO, NEW YORK, ASSIGNORS TO AMALIA MEY, OF SAME PLACE.

DRIER AND COOLER FOR GRAIN, &c.

SPECIFICATION forming part of Letters Patent No. 226,669, dated April 20, 1880.

Application filed February 25, 1880.

*To all whom it may concern:*

Be it known that we, FREDERIC H. C. MEY and MICHAEL J. STARK, both of Buffalo, Erie county, New York, have jointly invented certain new and useful Improvements on Grain, &c., Driers and Coolers; and we do hereby declare that the following description of our said invention, taken in connection with the accompanying sheet of drawings, forms a full, clear, and exact specification, which will enable others skilled in the art to which it appertains to make and use the same.

This invention has general reference to grain, malt, &c., driers and coolers; and it consists, essentially, in the combination of parts and details of construction, as hereinafter first fully set forth and described, and then pointed out in the claims.

Figure 1 is a side elevation of our improved grain, &c., drier and cooler. Fig. 2 is a plan of the same, the top being removed. Fig. 3 is a sectional elevation of a portion of our machine, taken in line Y Y of Fig. 2. Fig. 4 is a sectional plan in line Z Z of Fig. 3. Fig. 5 is a perspective elevation of the back of a pan and mechanism for suspending the same.

Like letters of reference indicate corresponding parts in all the figures.

This drier or cooler, which is especially designed for drying or cooling wet grain, malt, barley, oats, distillery-slop, and other articles or substances requiring the extraction or removal of water, moisture, or heat, is composed, essentially, of a series of vibratory pans, A, actuated by eccentrics or similar means; B, placed upon a vertical or otherwise arranged shaft, C. These pans A are made box-shaped, so as to produce therein a chamber, D, said chamber being formed by the bottom plate, E, end plates, F F', and a series of transverse plates or slats, G. These slats have on one of their longitudinal edges an upwardly-projecting ledge, H, and they are placed in position so that the ledge underlaps the front edge of the next adjacent slat, whereby the top surface of the pans becomes somewhat terrace-like, the object of such arrangement being hereinafter referred to.

The pans A are placed within a suitable frame composed of pillars I, a base-plate, J, and top K, the parts being suitably braced by diagonals (not shown) or in any other proper manner.

The pillars I are connected at proper intervals by a number of cross-pieces, L, the top surfaces of which have projections M, serving as bearings for plates N, the upper edge of which has again projections similar to those of the cross-pieces L, while the lower edge of said plates is of an inverted-V shape, the open portion resting upon the projections M.

The end plates, F, of the pans A have also inverted-V-shaped sockets P, which rest upon the projections on the plates N.

It will now be readily observed that this drier has pans arranged in pairs—that is to say, two pans with their terrace-like upper surface inclining in opposite directions are connected together by suspension members Q and supporting members Q', and are thereby operated together by one set of mechanism, B, only. By thus constructing the pans in pairs it is evident that if a pair of them is supported on opposite ends, such pair will be as well supported as if each pan were individually supported on both ends. It follows that fewer parts are required to operate a series of these pans, and that on this account the cost of a drier, as well as its subsequent running expense, wear and tear, &c., is greatly lessened.

Heretofore vibrating pans have been made in which flexible sheet metal or plates with hooked ends, &c., were the means employed for suspending them. In these constructions the flexible sheets were found to soon lose their flexibility, and, after crystallization of the molecules, to break suddenly, while the plates with hooked ends formed troughs wherein dust, grit, &c., could readily settle and wear out the parts almost as fast as they could be replaced.

To avoid these drawbacks we have adopted the present device of supporting-plates, in contradistinction to suspension-plates, with inverted-V-shaped sockets, which leave no receptacles wherein dust, dirt, or other gritty matter can be retained, and whereby one of the most serious as well as annoying obstacles has been overcome.

The rear plates, F, of the pans A project over the sides of the pans sufficiently to form a guard, R, while there are placed between the pillars I further guards, R', forming stationary and independent continuations of said guards R, to prevent the shooting over of the grain in its travel from one to the next succeeding pan below. The front plates, F', do not reach down to the bottom plates, E, so that a narrow slit or opening, S, is left in the front end of said pans.

Hot or cold air being the medium employed in our apparatus for producing the calorific or frigorific temperature, such air is forced into the compartments D by means of any suitable blowing-engine. The air is led to the pans by means of vertical tubes or pipes T, having branches T', provided with horizontal flanges U. Under the pans A are also horizontal pipes V, having on their ends downwardly-projecting branches V', terminating in oblong or round flanges V'', resting upon the flanges U of the branches T'.

By this construction we are enabled to vibrate the pans A, and at the same time to make a fairly tight joint at the junctions of the movable and stationary pipes. This construction is an essential feature of our machine, because all attempts heretofore made with flexible, telescoping, or other joints have proved failures for one reason or another. This device accomplishes its results in an inexpensive manner, is perfect in its action, has no destructible substances in its parts which heat could affect, and will at all times be as fairly tight as a joint of this kind need be.

Another very essential element in the construction of our drier, &c., is the terrace-like construction of the drying-surface over which the grain, &c., passes during the drying process, which causes a perfect movement of such substance in its downward course, while the projecting ledges H prevent such substance from working into the inner compartment, where the heat would soon set fire to the chaff, &c., and cause serious trouble.

In operation the grain, &c., to be dried is passed through the hopper X upon the uppermost pan, from whence the particles will travel downward from pan to pan, the projecting plates R preventing the grain from shooting over the next succeeding pan until the lower one is reached, when the substance now dried will fall into a bin or receptacle, to be elevated or removed in the usual manner.

Any number of pans found suitable may be employed, and either two or more pans connected together as specified, or all of them separately vibrated, without altering the essential parts of our machine.

Having thus fully described our invention, we claim as new and desire to secure to us by Letters Patent—

1. A drier or cooler for grain, &c., having a series of vibrating pans provided with means for operating them, as specified, said pans having a terrace-like surface, over which the substances to be operated upon are passed, formed by slats having upwardly-pointing ledges underlapping the next succeeding slat, and a blowing-engine having pipes terminating within the pans below the terrace-like surface G, for producing an air-blast through the chambers in said pans, as described.

2. In driers for grain, &c., a series of vibratory pans composed of the bottom plate, E, end plates, F and F', and the sides, as described, said pans being provided with a series of narrow slats, G, having upturned longitudinal edges H, the slats being constructed to overlap the upturned part, as specified.

3. In driers for grain, &c., the combination, with the pans A, having the horizontal pipes V, with downwardly-bent branches V' and flanges V'', of the supply-pipes T, having branches with horizontal flanges U resting loosely upon one another, to allow of the vibration of the pans, substantially as and for the object specified.

4. In driers for grain, &c., the combination, with the uprights I, having cross-pieces L, with upwardly-pointing projections M, the plates N, having the inverted-V-shaped sockets on one end and projections on the other end, and the pans A, provided with inverted-V-shaped sockets P, as and for the object indicated.

5. In driers for grain, &c., a series of vibratory pans arranged in pairs, with the terrace-like surface G inclining in opposite directions, the pairs being operated by means substantially as described, each pair in the same direction, and supported by means of the cross-beams L, having projections M, plates N, with V-shaped sockets O, and plate F, with similar sockets P, said plate F forming the end plate of the pans, as and for the purpose described.

In testimony that we claim the foregoing as our invention we have hereto set our hands in the presence of two subscribing witnesses.

F. H. C. MEY.
MICHAEL J. STARK.

Attest:
FRANK HIRSCH,
HATTIE L. WALKER.